(12) United States Patent
Ouyang et al.

(10) Patent No.: US 10,115,208 B2
(45) Date of Patent: Oct. 30, 2018

(54) IMAGE CHARACTERISTIC ESTIMATION METHOD AND DEVICE

(71) Applicant: Huawei Technologies Co., Ltd., Shenzhen (CN)

(72) Inventors: Wanli Ouyang, Hong Kong (HK); Xiao Chu, Hong Kong (HK); Wenqi Ju, Shenzhen (CN); Jianzhuang Liu, Shenzhen (CN); Xiaogang Wang, Hong Kong (HK)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 50 days.

(21) Appl. No.: 15/355,324

(22) Filed: Nov. 18, 2016

(65) Prior Publication Data

US 2017/0069112 A1 Mar. 9, 2017

Related U.S. Application Data

(63) Continuation of application No. PCT/CN2014/090905, filed on Nov. 12, 2014.

(30) Foreign Application Priority Data

May 22, 2014 (CN) .......................... 2014 1 0220036

(51) Int. Cl.
*G06T 7/60* (2017.01)
*G06T 7/00* (2017.01)
(Continued)

(52) U.S. Cl.
CPC ............ *G06T 7/60* (2013.01); *G06K 9/00362* (2013.01); *G06K 9/4628* (2013.01); *G06K 9/629* (2013.01);
(Continued)

(58) Field of Classification Search
CPC ... G06T 7/60; G06T 7/00; G06T 2207/10004; G06K 9/4628; G06K 9/00362
See application file for complete search history.

(56) References Cited

U.S. PATENT DOCUMENTS

| 6,038,337 A | 3/2000 | Lawrence et al. |
| 6,546,137 B1 | 4/2003 | Lai et al. |

(Continued)

FOREIGN PATENT DOCUMENTS

| CN | 101630365 A | 1/2010 |
| CN | 102231191 A | 11/2011 |

(Continued)

OTHER PUBLICATIONS

Machine Translation and Abstract of Chinese Publication No. CN102567719, Jul. 11, 2012, 11 pages.

(Continued)

*Primary Examiner* — Qian Yang
(74) *Attorney, Agent, or Firm* — Conley Rose, P.C.

(57) ABSTRACT

An image characteristic estimation method and device is presented, where content of the method includes extracting at least two eigenvalues of input image data, and executing the following operations for each extracted eigenvalue, until execution for the extracted eigenvalues is completed. Selecting an eigenvalue, and performing at least two matrix transformations on the eigenvalue using a pre-obtained matrix parameter in order to obtain a first matrix vector corresponding to the eigenvalue; when a first matrix vector corresponding to each extracted eigenvalue is obtained, obtaining second matrix vectors with respect to the at least two extracted eigenvalues using a convolutional network calculation method according to the obtained first matrix vector corresponding to each eigenvalue; and obtaining a status of an image characteristic in the image data by means (Continued)

of estimation according to the second matrix vectors. In this way, accuracy of estimation is effectively improved.

16 Claims, 2 Drawing Sheets

(51) Int. Cl.
  *G06K 9/00* (2006.01)
  *G06K 9/46* (2006.01)
  *G06K 9/62* (2006.01)

(52) U.S. Cl.
  CPC ......... *G06K 9/6214* (2013.01); *G06K 9/6247* (2013.01); *G06T 7/00* (2013.01); *G06T 2207/10004* (2013.01)

(56) References Cited

U.S. PATENT DOCUMENTS

| | | | | |
|---|---|---|---|---|
| 7,227,973 | B2* | 6/2007 | Ishiyama | G06K 9/00221 382/103 |
| 7,317,836 | B2 | 1/2008 | Fujimura et al. | |
| 7,620,202 | B2* | 11/2009 | Fujimura | G06K 9/00201 348/169 |
| 7,778,446 | B2 | 8/2010 | Yang et al. | |
| 8,401,295 | B2 | 3/2013 | Shiba | |
| 2004/0034611 | A1 | 2/2004 | Kee et al. | |
| 2005/0201595 | A1* | 9/2005 | Kamei | G06K 9/00275 382/118 |
| 2009/0324020 | A1* | 12/2009 | Hasebe | G06K 9/00228 382/115 |
| 2013/0223753 | A1* | 8/2013 | Sornborger | G06K 9/00496 382/254 |
| 2013/0266182 | A1 | 10/2013 | Shotton et al. | |

FOREIGN PATENT DOCUMENTS

| | | |
|---|---|---|
| CN | 102567719 A | 7/2012 |
| CN | 103077512 A | 5/2013 |
| JP | H1021406 A | 1/1998 |
| JP | 2004078959 A | 3/2004 |

OTHER PUBLICATIONS

Sun, H., "Research on Face Pose Estimation." Chinese Excellent Master Degree Paper, CNKI, Oct. 2007, 71 pages.

English Translation of Sun, H., "Research on Face Pose Estimation." Chinese Excellent Master Degree Paper, CNKI, Oct. 2007, 3 pages.

Foreign Communication From a Counterpart Application, Chinese Application No. 201410220036.0, Chinese Search Report dated May 16, 2017, 3 pages.

Foreign Communication From a Counterpart Application, Chinese Application No. 201410220036.0, Chinese Office Action dated May 25, 2017, 5 pages.

Foreign Communication From a Counterpart Application, Japanese Application No. 2016-568970, Japanese Notice of Allowance dated Dec. 26, 2017, 3 pages.

Foreign Communication From a Counterpart Application, Japanese Application No. 2016-568970, English Translation of Japanese Notice of Allowance dated Dec. 18, 2017, 1 pages.

Ouyang, W., et al., "Multi-source Deep Learning for Human Pose Estimation," XP032649447, IEEE Conference on Computer Vision and Pattern Recognition, 2014, pp. 2337-2344.

Yang, Y., et al., "Articulated Human Detection with Flexible Mixtures-of-Parts," XP055348333, IEEE Transactions on Pattern Analysis and Machine Intelligence, vol. 35, No. 12, Sep. 3-7, 2012, 16 pages.

Duan, K., et al., "A Multi-layer Composite Model for Human Pose Estimation," XP055348336, Sep. 7, 2012, 12 pages.

Foreign Communication From a Counterpart Application, European Application No. 14892648.8, Extended European Search Report dated Mar. 2, 2017, 14 pages.

Foreign Communication From a Counterpart Application, PCT/CN2014/090905, English Translation of International Search Report dated Feb. 25, 2015, 2 pages.

Foreign Communication From a Counterpart Application, PCT/CN2014/090905, English Translation of Written Opinion dated Feb. 25, 2015, 7 pages.

\* cited by examiner

IMAGE CHARACTERISTIC ESTIMATION METHOD AND DEVICE

CROSS-REFERENCE TO RELATED APPLICATIONS

This application is a continuation of International Application No. PCT/CN2014/090905, filed on Nov. 12, 2014, which claims priority to Chinese Patent Application No. 201410220036.0, filed on May 22, 2014. The disclosures of the aforementioned applications are hereby incorporated by reference in their entireties.

TECHNICAL FIELD

The present disclosure relates to the field of image processing technologies, and in particular, to an image characteristic estimation method and device.

BACKGROUND

With the development of modern society, application technologies such as shooting a video using a video camera, and taking a photograph using a smartphone gradually become popular, which means that a data volume of pictures required for processing is in a growth trend. Processing picture data relying on a manual technology costs a lot, and a probability of errors in a processing process is relatively high. Therefore, processing picture data using a computer becomes a development trend, and a computer vision technology becomes an important technology to be developed.

The computer vision technology refers to a technology in which how to "view" using a machine is studied, and further refers to machine vision technologies such as performing recognition, tracking, and measurement on a target using a camera and a computer instead of human eyes, and further performing image processing, so that an image processed by the computer becomes an image that is more suitable for human eyes to view or more suitable for being transferred to an apparatus for detection.

However, performing estimation on a characteristic in collected image data using a computer, for example, estimation of a human posture in image data in a complex environment in the computer vision technology, becomes a technical hot spot and a technical difficulty in the computer vision technology.

For example, in the security monitoring field, when a person on an occasion is monitored in a long period of time, estimation may be performed on an abnormal behavior of the monitored person by collecting a video image in this period of time and processing the video image collected in this period of time. This process belongs to human posture estimation.

However, in a current manner of performing estimation (for example, human posture estimation) on a characteristic in image data, one manner is using a tailored shooting apparatus to capture image data that meets a requirement of depth information, and using the image data and the depth information to determine a characteristic (for example, a position of each part of a human body) in the image data, so as to achieve a purpose of performing estimation on the characteristic in the image data. However, this manner has a relatively high requirement for hardware performance of the shooting apparatus and also has a relatively stringent requirement for a distance between a shooting object and the shooting apparatus, and in practical application, cannot be flexibly applicable to various practical needs. Consequently, accuracy of an obtained estimation result cannot be ensured.

Another manner is performing analysis on the characteristic in the obtained image data in manners such as edge detection and an image histogram. However, this manner is a manner of performing estimation on static image data. For image data collected in real time in real life, there is a problem of a relatively high error rate of characteristic estimation.

SUMMARY

In view of this, embodiments of the present disclosure provide an image characteristic estimation method and device, which are used to resolve a currently existing problem of low accuracy of characteristic estimation.

According to a first aspect of the present disclosure, an image characteristic estimation method is provided, including extracting at least two eigenvalues of input image data, where the eigenvalue includes at least a degree of matching between each characteristic and a corresponding template characteristic, a value of a probability that any two characteristics in the image data appear on a same position at the same time, and a value of a score of a change in a distance between two characteristics that have an association relationship; executing the following operations for each extracted eigenvalue, until execution for the extracted eigenvalues is completed: selecting an eigenvalue, and performing at least two matrix transformations on the eigenvalue using a pre-obtained matrix parameter, to obtain a first matrix vector corresponding to the eigenvalue; when a first matrix vector corresponding to each extracted eigenvalue is obtained, obtaining second matrix vectors with respect to the at least two extracted eigenvalues using a convolutional network calculation method according to the obtained first matrix vector corresponding to each eigenvalue; and obtaining a status of an image characteristic in the image data by means of estimation according to the second matrix vectors.

With reference to a possible implementation manner of the first aspect of the present disclosure, in a first possible implementation manner, the selecting an eigenvalue, and performing at least two matrix transformations on the eigenvalue using a pre-obtained matrix parameter, to obtain a first matrix vector corresponding to the eigenvalue includes selecting an eigenvalue, and performing a first matrix transformation on the eigenvalue using the pre-obtained matrix parameter, to obtain the first submatrix vector corresponding to the eigenvalue; performing a second matrix transformation on the first submatrix vector using the pre-obtained matrix parameter, to obtain the second submatrix vector corresponding to the eigenvalue; and by analogy, performing an $N^{th}$ matrix transformation on the $(N-1)^{th}$ submatrix vector using the pre-obtained matrix parameter, to obtain the first matrix vector corresponding to the eigenvalue, where N is a natural number.

With reference to the first possible implementation manner of the first aspect of the present disclosure, in a second possible implementation manner, the performing a first matrix transformation on the eigenvalue using the pre-obtained matrix parameter, to obtain the first submatrix vector corresponding to the eigenvalue includes obtaining the first submatrix vector corresponding to the eigenvalue in the following manner:

$$h^{1,i} = a(i^T * W^{1,i} + b^{1,i}),$$

where $h^{1,i}$ represents the first submatrix vector corresponding to the $i^{th}$ extracted eigenvalue, a is an activation function, $i^T$ is a transposed matrix of the $i^{th}$ eigenvalue, $W^{1,i}$ is the first matrix with respect to the $i^{th}$ eigenvalue in the matrix parameter, and $b^{1,i}$ is the first offset with respect to the $i^{th}$ eigenvalue.

With reference to the second possible implementation manner of the first aspect of the present disclosure, in a third possible implementation manner, the performing a second matrix transformation on the first submatrix vector using the pre-obtained matrix parameter, to obtain the second submatrix vector corresponding to the eigenvalue includes obtaining the second submatrix vector corresponding to the eigenvalue in the following manner:

$$h^{2,i} = a((h^{1,i})^T * W^{2,i} + (b^{2,i})^T),$$

where $h^{2,i}$ represents the second submatrix vector corresponding to the $i^{th}$ extracted eigenvalue, a is an activation function, $(h^{1,i})^T$ is a transposed matrix of the first submatrix vector of the $i^{th}$ eigenvalue, $W^{2,i}$ is the second matrix with respect to the $i^{th}$ eigenvalue in the matrix parameter, and $(b^{2,i})^T$ is the second offset with respect to the $i^{th}$ eigenvalue.

With reference to the possible implementation manner of the first aspect of the present disclosure, or with reference to the first possible implementation manner of the first aspect of the present disclosure, or with reference to the second possible implementation manner of the first aspect of the present disclosure, or with reference to the third possible implementation manner of the first aspect of the present disclosure, in a fourth possible implementation manner, the obtaining second matrix vectors with respect to the at least two extracted eigenvalues using a convolutional network calculation method according to the obtained first matrix vector corresponding to each eigenvalue includes obtaining, using the convolutional network calculation method, the second matrix vectors with respect to the at least two extracted eigenvalues in the following manner:

$$h^{n+1} = a((h^n)^T * W^{n+1} + b^{n+1}),$$

where $h^{n+1}$ is the second matrix vectors that are with respect to the at least two extracted eigenvalues and obtained using the convolutional network calculation method, a is an activation function, $h^n = [h^{n,1}, h^{n,2}, \ldots, h^{n,i}, \ldots, h^{n,n}]^T$, $h^{n,n}$ is a first matrix vector that is of the $n^{th}$ eigenvalue and on which an $n^{th}$ matrix transformation is performed, $W^{n+1}$ is the $(n+1)^{th}$ matrix in the matrix parameter, and $b^{n+1}$ is the $(n+1)^{th}$ offset.

With reference to the possible implementation manner of the first aspect of the present disclosure, or with reference to the first possible implementation manner of the first aspect of the present disclosure, or with reference to the second possible implementation manner of the first aspect of the present disclosure, or with reference to the third possible implementation manner of the first aspect of the present disclosure, or with reference to the fourth possible implementation manner of the first aspect of the present disclosure, in a fifth possible implementation manner, the status of the image characteristic in the image data includes position information of the image characteristic in the image data; and the obtaining a status of an image characteristic in the image data by means of estimation according to the second matrix vectors includes obtaining the status of the image characteristic in the image data by means of estimation in the following manner:

$$\tilde{y}^{pst} = (\tilde{h}^n)^T * W^{pst} + b^{pst},$$

where $\tilde{y}^{pst}$ is the status, obtained by means of estimation, of the image characteristic in the image data, $W^{pst}$ is a theoretical matrix parameter, $b^{pst}$ is a theoretical offset, $\tilde{h}^n$ is obtained according to $h^n$, and $h^n = [h^{n,1}, h^{n,2}, \ldots, h^{n,i}, \ldots, h^{n,n}]^T$.

With reference to the possible implementation manner of the first aspect of the present disclosure, or with reference to the first possible implementation manner of the first aspect of the present disclosure, or with reference to the second possible implementation manner of the first aspect of the present disclosure, or with reference to the third possible implementation manner of the first aspect of the present disclosure, or with reference to the fourth possible implementation manner of the first aspect of the present disclosure, or with reference to the fifth possible implementation manner of the first aspect of the present disclosure, in a sixth possible implementation manner, the method further includes determining reliability of the status obtained by means of estimation according to the second matrix vectors.

With reference to the sixth possible implementation manner of the first aspect of the present disclosure, in a seventh possible implementation manner, the determining a degree of reliability of the status obtained by means of estimation according to the second matrix vectors includes determining the reliability of the status obtained by means of estimation in the following manner:

$$\tilde{y}^{cls} = \sigma * ((h^n)^T * W^{cls} + b^{cls}),$$

where $\tilde{y}^{cls}$ is the determined reliability of the status obtained by means of estimation, $\sigma$ is a function, $\sigma(x) = (1 + \exp(-x))^{-1}$, $W^{cls}$ is a theoretical matrix parameter, and $b^{cls}$ is a theoretical offset.

According to a second aspect of the present disclosure, an image characteristic estimation device is provided, including an extraction module configured to extract at least two eigenvalues of input image data, where the eigenvalue includes at least a degree of matching between each characteristic and a corresponding template characteristic, a value of a probability that any two characteristics in the image data appear on a same position at the same time, and a value of a score of a change in a distance between two characteristics that have an association relationship; a first matrix vector calculation module configured to execute the following operations for each eigenvalue extracted by the extraction module, until execution for the extracted eigenvalues is completed: selecting an eigenvalue, and performing at least two matrix transformations on the eigenvalue using a pre-obtained matrix parameter, to obtain a first matrix vector corresponding to the eigenvalue; a second matrix vector calculation module configured to, when the first matrix vector that corresponds to each extracted eigenvalue and is obtained by means of calculation by the first matrix vector calculation module is obtained, obtain second matrix vectors with respect to the at least two extracted eigenvalues using a convolutional network calculation method according to the obtained first matrix vector corresponding to each eigenvalue; and an estimation module configured to obtain a status of an image characteristic in the image data by means of estimation according to the second matrix vectors obtained by means of calculation by the second matrix vector calculation module.

With reference to a possible implementation manner of the second aspect of the present disclosure, in a first possible implementation manner, the first matrix vector calculation module is configured to select an eigenvalue, and perform a first matrix transformation on the eigenvalue using the pre-obtained matrix parameter, to obtain the first submatrix vector corresponding to the eigenvalue; perform a second matrix transformation on the first submatrix vector using the pre-obtained matrix parameter, to obtain the second submatrix vector corresponding to the eigenvalue; and by analogy, perform an $N^{th}$ matrix transformation on the $(N-1)^{th}$ submatrix vector using the pre-obtained matrix parameter, to obtain the first matrix vector corresponding to the eigenvalue, where N is a natural number.

With reference to the first possible implementation manner of the second aspect of the present disclosure, in a second possible implementation manner, the first matrix vector calculation module is configured to obtain the first submatrix vector corresponding to the eigenvalue in the following manner:

$$h^{1,i} = a(i^T * W^{1,i} + b^{1,i}),$$

where $h^{1,i}$ represents the first submatrix vector corresponding to the $i^{th}$ extracted eigenvalue, a is an activation function, $i^T$ is a transposed matrix of the $i^{th}$ eigenvalue, $W^{1,i}$ is the first matrix with respect to the $i^{th}$ eigenvalue in the matrix parameter, and $b^{1,i}$ is the first offset with respect to the $i^{th}$ eigenvalue.

With reference to the second possible implementation manner of the second aspect of the present disclosure, in a third possible implementation manner, the first matrix vector calculation module is configured to obtain the second submatrix vector corresponding to the eigenvalue in the following manner:

$$h^{2,i} = a((h^{1,i})^T * W^{2,i} + (b^{2,i})^T),$$

where $h^{2,i}$ represents the second submatrix vector corresponding to the $i^{th}$ extracted eigenvalue, a is an activation function, $(h^{1,i})^T$ is a transposed matrix of the first submatrix vector of the $i^{th}$ eigenvalue, $W^{2,i}$ is the second matrix with respect to the $i^{th}$ eigenvalue in the matrix parameter, and $(b^{2,i})^T$ is the second offset with respect to the $i^{th}$ eigenvalue.

With reference to the possible implementation manner of the second aspect of the present disclosure, or with reference to the first possible implementation manner of the second aspect of the present disclosure, or with reference to the second possible implementation manner of the second aspect of the present disclosure, or with reference to the third possible implementation manner of the second aspect of the present disclosure, in a fourth possible implementation manner, the second matrix vector calculation module is configured to obtain, using the convolutional network calculation method, the second matrix vectors with respect to the at least two extracted eigenvalues in the following manner:

$$h^{n+1} = a((h^n)^T * W^{n+1} + b^{n+1}),$$

where $h^{n+1}$ is the second matrix vectors that are with respect to the at least two extracted eigenvalues and obtained using the convolutional network calculation method, a is an activation function, $h^n = [h^{n,1}, h^{n,2}, \ldots, h^{n,i}, \ldots, h^{n,n}]^T$, $h^{n,n}$ is a first matrix vector that is of the $n^{th}$ eigenvalue and on which an $n^{th}$ matrix transformation is performed, $W^{n+1}$ is the $(n+1)^{th}$ matrix in the matrix parameter, and $b^{n+1}$ is the $(n+1)^{th}$ offset.

With reference to the possible implementation manner of the second aspect of the present disclosure, or with reference to the first possible implementation manner of the second aspect of the present disclosure, or with reference to the second possible implementation manner of the second aspect of the present disclosure, or with reference to the third possible implementation manner of the second aspect of the present disclosure, or with reference to the fourth possible implementation manner of the second aspect of the present disclosure, in a fifth possible implementation manner, the status of the image characteristic in the image data includes position information of the image characteristic in the image data; and the estimation module is configured to obtain the status of the image characteristic in the image data by means of estimation in the following manner:

$$\tilde{y}^{pst} = (\tilde{h}^n)^T * W^{pst} + b^{pst},$$

where $\tilde{y}^{pst}$ is the status, obtained by means of estimation, of the image characteristic in the image data, $W^{pst}$ is a theoretical matrix parameter, $b^{pst}$ is a theoretical offset, $\tilde{h}^n$ is obtained according to $h^n$, and $\tilde{h}^n = [h^{n,1}, h^{n,2}, \ldots, h^{n,i}, \ldots, h^{n,n}]^T$.

With reference to the possible implementation manner of the second aspect of the present disclosure, or with reference to the first possible implementation manner of the second aspect of the present disclosure, or with reference to the second possible implementation manner of the second aspect of the present disclosure, or with reference to the third possible implementation manner of the second aspect of the present disclosure, or with reference to the fourth possible implementation manner of the second aspect of the present disclosure, or with reference to the fifth possible implementation manner of the second aspect of the present disclosure, in a sixth possible implementation manner, the device further includes a reliability calculation module configured to determine reliability of the status obtained by means of estimation according to the second matrix vectors obtained by means of calculation by the second matrix vector calculation module.

With reference to the sixth possible implementation manner of the second aspect of the present disclosure, in a seventh possible implementation manner, the reliability calculation module is configured to determine the reliability of the status obtained by means of estimation in the following manner:

$$\tilde{y}^{cls} = \sigma * ((h^n)^T * W^{cls} + b^{cls}),$$

where $\tilde{y}^{cls}$ is the determined reliability of the status obtained by means of estimation, $\sigma$ is a function, $\sigma(x) = (1 + \exp(-x))^{-1}$, $W^{cls}$ is a theoretical matrix parameter, and $b^{cls}$ is a theoretical offset.

According to a third aspect of the present disclosure, an image characteristic estimation device is provided, including at least one processor, a communications bus, a memory, and at least one communications interface, where the communications bus is configured to transfer information between the at least one processor, the memory, and the at least one communications interface; the memory is configured to store application program code; and a processor configured to execute an application program code stored in the memory, which includes extracting at least two eigenvalues of input image data, where the eigenvalue includes at least a degree of matching between each characteristic and a corresponding template characteristic, a value of a probability that any two characteristics in the image data appear on a same position at the same time, and a value of a score of a change in a distance between two characteristics that have an association relationship; executing the following operations for each extracted eigenvalue, until execution for the extracted eigenvalues is completed: selecting an eigenvalue, and performing at least two matrix transformations on the eigenvalue using a pre-obtained matrix parameter, to obtain a first matrix vector corresponding to the eigenvalue; when a first matrix vector corresponding to each extracted eigenvalue is obtained, obtaining second matrix vectors with respect to the at least two extracted eigenvalues using a convolutional network calculation method according to the obtained first matrix vector corresponding to each eigenvalue; and obtaining a status of an image characteristic in the image data by means of estimation according to the second matrix vectors.

With reference to a possible implementation manner of the third aspect of the present disclosure, in a first possible implementation manner, the processor executes selecting an eigenvalue, and performing a first matrix transformation on the eigenvalue using the pre-obtained matrix parameter, to obtain the first submatrix vector corresponding to the eigenvalue; performing a second matrix transformation on the first submatrix vector using the pre-obtained matrix parameter, to obtain the second submatrix vector corresponding to the eigenvalue; and by analogy, performing an $N^{th}$ matrix transformation on the $(N-1)^{th}$ submatrix vector using the pre-obtained matrix parameter, to obtain the first matrix vector corresponding to the eigenvalue, where N is a natural number.

With reference to the first possible implementation manner of the third aspect of the present disclosure, in a second possible implementation manner, the processor executes obtaining the first submatrix vector corresponding to the eigenvalue in the following manner:

$$h^{1,i}=a(i^T*W^{1,i}+b^{1,i}),$$

where $h^{1,i}$ represents the first submatrix vector corresponding to the $i^{th}$ extracted eigenvalue, a is an activation function, $i^T$ is a transposed matrix of the $i^{th}$ eigenvalue, $W^{1,i}$ is the first matrix with respect to the $i^{th}$ eigenvalue in the matrix parameter, and $b^{1,i}$ is the first offset with respect to the $i^{th}$ eigenvalue.

With reference to the second possible implementation manner of the third aspect of the present disclosure, in a third possible implementation manner, the processor executes obtaining the second submatrix vector corresponding to the eigenvalue in the following manner:

$$h^{2,i}=a((h^{1,i})^T*W^{2,i}+(b^{2,i})^T),$$

where $h^{2,i}$ represents the second submatrix vector corresponding to the $i^{th}$ extracted eigenvalue, a is an activation function, $(h^{1,i})^T$ is a transposed matrix of the first submatrix vector of the $i^{th}$ eigenvalue, $W^{2,i}$ is the second matrix with respect to the $i^{th}$ eigenvalue in the matrix parameter, and $(b^{2,i})^T$ is the second offset with respect to the $i^{th}$ eigenvalue.

With reference to the possible implementation manner of the third aspect of the present disclosure, or with reference to the first possible implementation manner of the third aspect of the present disclosure, or with reference to the second possible implementation manner of the third aspect of the present disclosure, or with reference to the third possible implementation manner of the third aspect of the present disclosure, in a fourth possible implementation manner, the processor executes obtaining, using the convolutional network calculation method, the second matrix vectors with respect to the at least two extracted eigenvalues in the following manner:

$$h^{n+1}=a((h^n)^T*W^{n+1}+b^{n+1}),$$

where $h^{n+1}$ is the second matrix vectors that are with respect to the at least two extracted eigenvalues and obtained using the convolutional network calculation method, a is an activation function, $h^n=[h^{n,1},h^{n,2}, \ldots ,h^{n,i}, \ldots ,h^{n,n}]^T$, $h^{n,n}$ is a first matrix vector that is of the $n^{th}$ eigenvalue and on which an $n^{th}$ matrix transformation is performed, $W^{n+1}$ is the $(n+1)^{th}$ matrix in the matrix parameter, and is the $(n+1)^{th}$ offset.

With reference to the possible implementation manner of the third aspect of the present disclosure, or with reference to the first possible implementation manner of the third aspect of the present disclosure, or with reference to the second possible implementation manner of the third aspect of the present disclosure, or with reference to the third possible implementation manner of the third aspect of the present disclosure, or with reference to the fourth possible implementation manner of the third aspect of the present disclosure, in a fifth possible implementation manner, the status of the image characteristic in the image data includes position information of the image characteristic in the image data; and the processor executes obtaining the status of the image characteristic in the image data by means of estimation in the following manner:

$$\tilde{y}^{pst}=(\tilde{h}^n)^T*W^{pst}+b^{pst},$$

where $\tilde{y}^{pst}$ is the status, obtained by means of estimation, of the image characteristic in the image data, $W^{pst}$ is a theoretical matrix parameter, $b^{pst}$ is a theoretical offset, $\tilde{h}^n$ is obtained according to $h^n$, and $h^n=[h^{n,1},h^{n,2}, \ldots , h^{n,i}, \ldots ,h^{n,n}]^T$.

With reference to the possible implementation manner of the third aspect of the present disclosure, or with reference to the first possible implementation manner of the third aspect of the present disclosure, or with reference to the second possible implementation manner of the third aspect of the present disclosure, or with reference to the third possible implementation manner of the third aspect of the present disclosure, or with reference to the fourth possible implementation manner of the third aspect of the present disclosure, or with reference to the fifth possible implementation manner of the third aspect of the present disclosure, in a sixth possible implementation manner, the processor executes determining reliability of the status obtained by means of estimation according to the second matrix vectors.

With reference to the sixth possible implementation manner of the third aspect of the present disclosure, in a seventh possible implementation manner, the processor executes determining the reliability of the status obtained by means of estimation in the following manner:

$$\tilde{y}^{cls}=\sigma*((\tilde{h}^n)^T*W^{cls}+b^{cls}),$$

where $\tilde{y}^{cls}$ is the determined reliability of the status obtained by means of estimation, σ is a function, $\sigma(x)=(1+\exp(-x))^{-1}$, $W^{cls}$ a theoretical matrix parameter, and $b^{cls}$ is a theoretical offset.

In the embodiments of the present disclosure, at least two eigenvalues of input image data are extracted, where the eigenvalue includes at least a degree of matching between each characteristic and a corresponding template characteristic, a value of a probability that any two characteristics in the image data appear on a same position at the same time, and a value of a score of a change in a distance between two characteristics that have an association relationship; the following operations are executed for each extracted eigenvalue, until execution for the extracted eigenvalues is completed: selecting an eigenvalue, and performing at least two matrix transformations on the eigenvalue using a pre-obtained matrix parameter, to obtain a first matrix vector corresponding to the eigenvalue; when a first matrix vector corresponding to each extracted eigenvalue is obtained, second matrix vectors with respect to the at least two extracted eigenvalues are obtained using a convolutional network calculation method according to the obtained first matrix vector corresponding to each eigenvalue; and a status of an image characteristic in the image data is obtained by means of estimation according to the second matrix vectors. In this way, for multiple different eigenvalues obtained by means of extraction, multiple matrix transformations are performed for each eigenvalue, and a combination vector is obtained in a manner of convolutional network calculation on a matrix vector obtained after transformations of each eigenvalue; finally, estimation is performed on the image characteristic in the image data in a fully-connected belief network calculation manner, which effectively improves accuracy of estimation.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and persons of ordinary skill in the art may still derive other drawings from these accompanying drawings without creative efforts.

DESCRIPTION OF EMBODIMENTS

To achieve the objectives of the present disclosure, embodiments of the present disclosure provide an image characteristic estimation method and device. At least two eigenvalues of input image data are extracted, where the eigenvalue includes at least a degree of matching between each characteristic and a corresponding template characteristic, a value of a probability that any two characteristics in the image data appear on a same position at the same time, and a value of a score of a change in a distance between two characteristics that have an association relationship; the following operations are executed for each extracted eigenvalue, until execution for the extracted eigenvalues is completed: selecting an eigenvalue, and performing at least two matrix transformations on the eigenvalue using a pre-obtained matrix parameter, to obtain a first matrix vector corresponding to the eigenvalue; when a first matrix vector corresponding to each extracted eigenvalue is obtained, second matrix vectors with respect to the at least two extracted eigenvalues are obtained using a convolutional network calculation method according to the obtained first matrix vector corresponding to each eigenvalue; and a status of an image characteristic in the image data is obtained by means of estimation according to the second matrix vectors. In this way, for multiple different eigenvalues obtained by means of extraction, multiple matrix transformations are performed for each eigenvalue, and a combination vector is obtained in a manner of convolutional network calculation on a matrix vector obtained after transformations of each eigenvalue; finally, estimation is performed on the image characteristic in the image data in a fully-connected belief network calculation manner, which effectively improves accuracy of estimation.

The following further describes the present disclosure in detail with reference to the accompanying drawings. The described embodiments are merely some but not all of the embodiments of the present disclosure. All other embodiments obtained by persons of ordinary skill in the art based on the embodiments of the present disclosure without creative efforts shall fall within the protection scope of the present disclosure.

Figure 1:
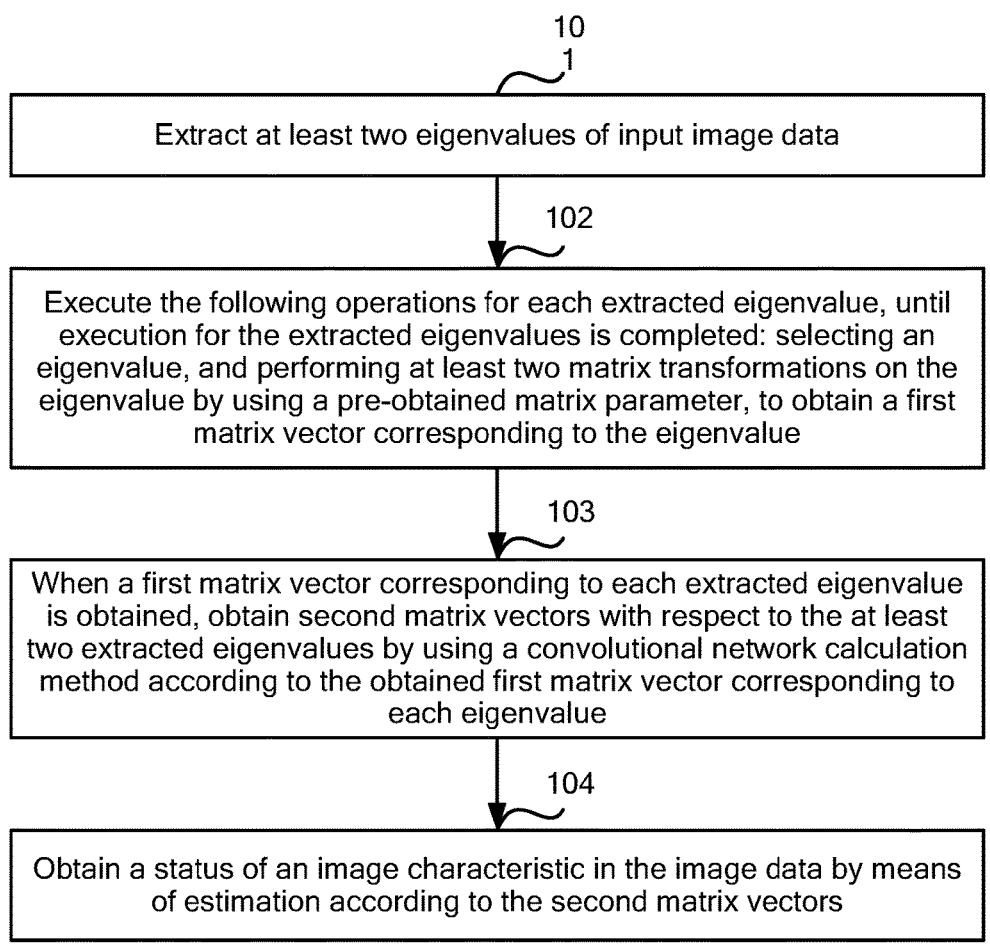
FIG. 1 is a schematic flowchart of an image characteristic estimation method according to the present disclosure.

As shown in FIG. 1, FIG. 1 is a schematic flowchart of an image characteristic estimation method according to the present disclosure. The method may be described as follows.

Step 101: Extract at least two eigenvalues of input image data.

The eigenvalue includes at least a degree of matching between each characteristic and a corresponding template characteristic, a value of a probability that any two characteristics in the image data appear on a same position at the same time, and a value of a score of a change in a distance between two characteristics that have an association relationship.

In step 101, the input image data is received, where the image data may be picture data, or may be video data, or may be a combination of picture data and video data, which is not limited herein.

The received image data needs to be processed in a manner of image data characteristic detection, so that processed image data is concentrated in a relatively small range. An image characteristic in the image data is concentrated in the relatively small range, which lays a foundation for subsequent steps.

The at least two eigenvalues of the received image data are extracted, where the eigenvalue obtained by means of extraction includes at least the degree of matching between each characteristic and the corresponding template characteristic, the value of the probability that any two characteristics in the image data appear on the same position at the same time, and the value of the score of the change in the distance between two characteristics that have an association relationship.

The degree of matching between each characteristic and the corresponding template characteristic refers to a degree of matching between a characteristic and a template characteristic corresponding to the characteristic, and can be obtained in the following manner:

$$S=S_a(I,t_p,z_p)=(w_p^{t_p})^T*f(I,z_p),$$

where S refers to the degree of matching between each characteristic and the corresponding template characteristic, $S(I,t,z)$ is a matching degree function, $$S(I, t, z) = S_c(t) + \sum_{p,q} S_d(t, z, p, q) + \sum_p S_a(I, t_p, z_p),$$

I is the received image data, $t_p$ is an appearance mixture type (appearance mixture type) of the $p^{th}$ characteristic, $z_p$ is a position of the $p^{th}$ characteristic, $w_p^{t_p}$ is a theoretical parameter, and $f(I,z_p)$ is a function for calculating an eigenvalue, in the image data I, whose position meets $z_p$, where p and q are quantities of characteristics.

For example, it is assumed that the received image data is image data that includes a human body characteristic, and the characteristic is a human eye; the received human eye characteristic is extracted. In this case, matching is performed between an image characteristic of a position of an eye in the image data and a template characteristic of an eye in an eye characteristic library, to determine an eigenvalue of the eye characteristic in the received image data.

The value of the probability that any two characteristics in the image data appear on the same position at the same time refers to a probability that any two characteristics appear on a same position at the same time and that is obtained by means of calculation using a formula for calculating a possibility that different characteristics trained in advance appear at the same time.

The formula for calculating the possibility that different characteristics trained in advance appear at the same time is as follows:

$$t=S_c(t)=\Sigma_p b_p^{t_p}+\Sigma_{p,q} b_{p,q}^{t_p,t_q},$$

where t is a probability that different characteristics appear at the same time, $S_c(t)$ represents a function for calculating the probability, $b_p^{t_p}$ represents a score of the $p^{th}$ characteristic appearing in the $t_p^{th}$ appearance mixture type, $\Sigma_p b_p^{t_p}$ represents a sum of scores of multiple characteristics appearing in the $t_p^{th}$ appearance mixture type at the same time, $b_{p,q}^{t_p,t_q}$ represents a score of the $p^{th}$ characteristic and the $q^{th}$ characteristic appearing at the same time, and $\Sigma_{p,q} b_{p,q}^{t_p,t_q}$ represents a sum of scores of multiple characteristics appearing at the same time.

For example, it is assumed that the received image data is image data that includes a human body characteristic, and the characteristic is a human eye and a human eyebrow; the received human eye characteristic and human eyebrow characteristic are extracted, and a value of a probability that the human eye characteristic and the human eyebrow characteristic appear on a same position is calculated.

The value of the score of the change in the distance between two characteristics that have an association relationship refers to a proper value of a score of the change in the distance between two characteristics that have an association relationship. For further estimation of the image characteristic in the image data, because the change in the distance between two characteristics that have an association relationship falls within a proper change range, whether a distance between two characteristics that have an association relationship changes and a change status need to be extracted.

A manner of calculating the value of the score of the change in the distance between two characteristics that have an association relationship includes but is not limited to the following manner:

$$d=S_d(z_p,z_q)=(w_{p,q}^{t_p,t_q})^T * d(z_p-z_q),$$

where $w_{p,q}^{t_p,t_q}$ a matrix parameter, $d(z_p-z_q)=[dx,dy,dx^2,dy^2]^T$, $dx=X_p-X_q$ represents a difference, in an X direction, between the $p^{th}$ characteristic and the $q^{th}$ characteristic, and $dy=y_p-y_q$ represents a difference, in a y direction, between the $p^{th}$ characteristic and the $q^{th}$ characteristic.

For example, it is assumed that the received image data is image data that includes a human body characteristic, and the characteristic is a human eye and a human eyebrow; the received human eye characteristic and human eyebrow characteristic are extracted, and a value of a score of a change in a distance between the human eye characteristic and human eyebrow characteristic is calculated. A change in an expression of a current person may be determined according to the value of the score. For example, a relatively small distance score indicates a slightly small change of an expression; a relatively large distance score indicates a large change of an expression, which indicates either of happiness or sadness, and the like.

Step 102: Execute the following operations for each extracted eigenvalue, until execution for the extracted eigenvalues is completed: selecting an eigenvalue, and performing at least two matrix transformations on the eigenvalue using a pre-obtained matrix parameter, to obtain a first matrix vector corresponding to the eigenvalue.

In step 102, when multiple eigenvalues are obtained in step 101, each obtained eigenvalue is processed according to a set calculation sequence.

The selecting an eigenvalue, and performing at least two matrix transformations on the eigenvalue using a pre-obtained matrix parameter, to obtain a first matrix vector corresponding to the eigenvalue includes selecting an eigenvalue, and performing a first matrix transformation on the eigenvalue using the pre-obtained matrix parameter, to obtain the first submatrix vector corresponding to the eigenvalue; performing a second matrix transformation on the first submatrix vector using the pre-obtained matrix parameter, to obtain the second submatrix vector corresponding to the eigenvalue; and by analogy, performing an $N^{th}$ matrix transformation on the $(N-1)^{th}$ submatrix vector using the pre-obtained matrix parameter, to obtain the first matrix vector corresponding to the eigenvalue, where N is a natural number.

The performing a first matrix transformation on the eigenvalue using the pre-obtained matrix parameter, to obtain the first submatrix vector corresponding to the eigenvalue includes obtaining the first submatrix vector corresponding to the eigenvalue in the following manner:

$$h^{1,i}=a(i^T*W^{1,i}+b^{1,i}),$$

where $h^{1,i}$ represents the first submatrix vector corresponding to the $i^{th}$ extracted eigenvalue, a is an activation function, $i^T$ is a transposed matrix of the $i^{th}$ eigenvalue, $W^{1,i}$ is the first matrix with respect to the $i^{th}$ eigenvalue in the matrix parameter, and $b^{1,i}$ is the first offset with respect to the $i^{th}$ eigenvalue.

The performing a second matrix transformation on the first submatrix vector using the pre-obtained matrix parameter, to obtain the second submatrix vector corresponding to the eigenvalue includes obtaining the second submatrix vector corresponding to the eigenvalue in the following manner:

$$h^{2,i}=a((h^{1,i})^T*W^{2,i}+(b^{2,i})^T),$$

where $h^{2,i}$ represents the second submatrix vector corresponding to the $i^{th}$ extracted eigenvalue, a is an activation function, $(h^{1,i})^T$ is a transposed matrix of the first submatrix vector of the $i^{th}$ eigenvalue, $W^{2,i}$ is the second matrix with respect to the $i^{th}$ eigenvalue in the matrix parameter, and $(b^{2,i})^T$ is the second offset with respect to the $i^{th}$ eigenvalue.

The performing an $N^{th}$ matrix transformation on the $(N-1)^{th}$ submatrix vector using the pre-obtained matrix parameter, to obtain the first matrix vector corresponding to the eigenvalue includes obtaining the first matrix vector corresponding to the eigenvalue in the following manner:

$$h^{n,i}=a((h^{n-1,i})^T*W^{n,i}+b^{n,i}),$$

where $h^{n,i}$ represents a first matrix vector corresponding to the $i^{th}$ extracted eigenvalue, a is an activation function, $(h^{n-1,i})^T$ is a transposed matrix of the $(N-1)^{th}$ submatrix vector of the $i^{th}$ eigenvalue, $W^{n,i}$ is the $N^{th}$ matrix with respect to the $i^{th}$ eigenvalue in the matrix parameter, and $b^{n,i}$ is the $N^{th}$ offset with respect to the $i^{th}$ eigenvalue.

It is assumed that there are three extracted eigenvalues, which are respectively an eigenvalue 1 (denoted by s), an eigenvalue 2 (denoted by d), and an eigenvalue 3 (denoted by t). After two matrix transformations, a first matrix vector of the eigenvalue 1, a first matrix vector of the eigenvalue 2, and a first matrix vector of the eigenvalue 3 are respectively obtained.

For the eigenvalue 1, after a first matrix transformation, $h^{1,1}=a(s^T*W^{1,1}+b^{1,1})$ is obtained; after a second matrix transformation, $h^{2,1}=a((h^{1,1})^T*W^{2,1}+(b^{2,1})^T)$ is obtained, that is, the first matrix vector of the eigenvalue 1 is obtained.

For the eigenvalue 2, after a first matrix transformation, $h^{1,2}=a(d^T*W^{1,2}+b^{1,2})$ is obtained; after a second matrix transformation, $h^{2,2}=a((h^{1,2})^T*W^{2,2}+(b^{2,2})^T)$ is obtained, that is, the first matrix vector of the characteristic 2 is obtained.

For eigenvalue 3, after a first matrix transformation, $h^{1,3}=a(t^T*W^{1,3}+b^{1,3})$ is obtained; after a second matrix transformation, $h^{2,3}=a(h^{1,3})^T*W^{2,3}+(b^{2,3})^T)$ is obtained, that is, the first matrix vector of the eigenvalue 3 is obtained.

Step 103: When a first matrix vector corresponding to each extracted eigenvalue is obtained, obtain second matrix vectors with respect to the at least two extracted eigenvalues using a convolutional network calculation method according to the obtained first matrix vector corresponding to each eigenvalue.

In step 103, the obtaining second matrix vectors with respect to the at least two extracted eigenvalues using a convolutional network calculation method according to the obtained first matrix vector corresponding to each eigenvalue includes obtaining, using the convolutional network calculation method, the second matrix vectors with respect to the at least two extracted eigenvalues in the following manner:

$$h^{n+1}=a((h^n)^T*W^{n+1}+b^{n+1}), \text{ where}$$

$h^{n+1}$ is the second matrix vectors that are with respect to the at least two extracted eigenvalues and obtained using the convolutional network calculation method, a is an activation function, $h^n=[h^{n,1},h^{n,2},\ldots,h^{n,i},\ldots,h^{n,n}]^T$, $h^{n,n}$ is a first matrix vector that is of the $n^{th}$ eigenvalue and on which an $n^{th}$ matrix transformation is performed, $W^{n+1}$ is the $(n+1)^{th}$ matrix in the matrix parameter, and $b^{n+1}$ is the $(n+1)^{th}$ offset.

It should be noted that a is an activation function, and when an activation threshold is 3.5, a([2,3,4])=[0,0,1], a sigmoid function is recommended for use.

It is assumed that there are three extracted eigenvalues, which are respectively an eigenvalue 1 (denoted by s), an eigenvalue 2 (denoted by d), and an eigenvalue 3 (denoted by t). After two matrix transformations, a first matrix vector of the eigenvalue 1, a first matrix vector of the eigenvalue 2, and a first matrix vector of the eigenvalue 3 are respectively obtained. The second matrix vectors with respect to the at least two extracted eigenvalues are obtained using the convolutional network calculation method according to the obtained first matrix vector of the eigenvalue 1, the obtained first matrix vector of the eigenvalue 2, and the obtained first matrix vector of the eigenvalue 3:

$$h^3=a((h^2)^T*W^3+b^3),$$

where $h^3$ is the second matrix vectors that are with respect to the at least two extracted eigenvalues and obtained using the convolutional network calculation method, a is an activation function, $h^2=[h^{2,1},h^{2,2},h^{2,3}]^T$, $W^3$ is the third matrix in the matrix parameter, and $b^3$ is the third offset.

Step 104: Obtain a status of an image characteristic in the image data by means of estimation according to the second matrix vectors.

In step 104, after the second matrix vectors are obtained, the status of the image characteristic in the image data is obtained by means of estimation according to the second matrix vectors, where the status of the image characteristic in the image data includes position information of the image characteristic in the image data.

The status of the image characteristic in the image data is obtained by means of estimation in the following manner:

$$\tilde{y}^{pst}=(\tilde{h}^n)^T*W^{pst}+b^{pst},$$

where $\tilde{y}^{pst}$ is the status, obtained by means of estimation, of the image characteristic in the image data, $W^{pst}$ is a theoretical matrix parameter, $b^{pst}$ is a theoretical offset, $\tilde{h}^n$ is obtained according to $h^n$, and $h^n=[h^{n,1},h^{n,2},\ldots,h^{n,i},\ldots,h^{n,n}]^T$.

In another embodiment of the present disclosure, the method further includes determining reliability of the status obtained by means of estimation according to the second matrix vectors.

The reliability of the status obtained by means of estimation is determined in the following manner:

$$\tilde{y}^{cls}=\sigma*((h^n)^T*W^{cls}+b^{cls}),$$

where $\tilde{y}^{cls}$ is the determined reliability of the status obtained by means of estimation, σ is a function, $\sigma(x)=(1+\exp(-x))^{-1}$, $W^{cls}$ is a theoretical matrix parameter, and $b^{cls}$ is a theoretical offset.

When the reliability of the status obtained by means of estimation is calculated, the reliability obtained by means of calculation is compared with a set reliability threshold to further determine accuracy of an estimation result.

In addition, after the second matrix vectors are obtained, the estimated status and the reliability of the estimated status may be obtained by means of calculation using a fully-connected belief network, which further improves accuracy of an estimation result.

It should be noted that this embodiment of the present disclosure involves a W-type matrix (denoted by W*) associated with a W-matrix parameter and a b-type offset (denoted by b*) associated with a b-offset parameter, which may be obtained in a training manner, or may be set according to a practical need, and is not limited herein.

A method for obtaining W*, b*, $W^{cls}$, and $b^{cls}$ in the training manner may be described as follows.

In the first step, positive sample image data and negative sample image data are input and are clustered into k groups using a k-means method, where k is a set integer.

In the second step, values of W*, b*, $W^{cls}$, and $b^{cls}$ are obtained using a Restricted Boltzmann Machine (RBM) training method in a well-known technology.

In the third step, values of W*, b*, $W^{cls}$, and $b^{cls}$ are obtained again by means of calculation using a target function and a backpropagation (BP) algorithm in a well-known technology.

The target function may be:

$$J(\lambda)=\Sigma_n(J_1(y_n^{cls},\tilde{y}_n^{cls})+y_n^{cls}J_2(y_n^{pst},\tilde{y}_n^{pst})+J_3(w^*,w^{cls}),$$

where $$J_1(y_n^{cls},\tilde{y}_n^{cls})=y_n^{cls}\log(\tilde{y}_n^{cls})+(1-y_n^{cls})\log(1-\tilde{y}_n^{cls});$$
$$J_2(y_n^{pst},\tilde{y}_n^{pst})=\|y_n^{pst}-\tilde{y}_n^{pst}\|^2; \text{ and}$$

$$J_3(w^*,w^{cls})=\Sigma_{i,j}|w_{i,j}^*|+\Sigma_i|w_i^{cls}|,$$

where n is an integer, and a value of n is a quantity of training samples.

$y_n^{cls}$ is set estimated reliability of an image characteristic of the $n^{th}$ training sample, $\tilde{y}_n^{cls}$ is estimated reliability, obtained by means of calculation, of the $n^{th}$ training sample, $y_n^{pst}$ is a set estimated status of the image characteristic of the $n^{th}$ training sample, $\tilde{y}_n^{pst}$ is an estimated status, obtained by means of calculation, of the $n^{th}$ training sample, $w_{i,j}^*$ is a value of the $i^{th}$ row and the $j^{th}$ column in W* that is obtained by means of calculation in the second step, and $w_i^{cls}$ is the $i^{th}$ value in $W^{cls}$ that is obtained by means of calculation in the second step.

It should be noted that the third step is solved by means of gradient descent, the values of $W^*$, $b^*$, $W_{cls}$, and $b^{cls}$ that are obtained in the second step are used as initial points for the gradient descent in the third step, and then, new values of $W^*$, $b^*$, $W^{cls}$, and $b^{cls}$ are obtained using a gradient descent method in the third step.

According to the solution in Embodiment 1 of the present disclosure, at least two eigenvalues of input image data are extracted, where the eigenvalue includes at least a degree of matching between each characteristic and a corresponding template characteristic, a value of a probability that any two characteristics in the image data appear on a same position at the same time, and a value of a score of a change in a distance between two characteristics that have an association relationship; the following operations are executed for each extracted eigenvalue, until execution for the extracted eigenvalues is completed: selecting an eigenvalue, and performing at least two matrix transformations on the eigenvalue using a pre-obtained matrix parameter, to obtain a first matrix vector corresponding to the eigenvalue; when a first matrix vector corresponding to each extracted eigenvalue is obtained, second matrix vectors with respect to the at least two extracted eigenvalues are obtained using a convolutional network calculation method according to the obtained first matrix vector corresponding to each eigenvalue; and a status of an image characteristic in the image data is obtained by means of estimation according to the second matrix vectors. In this way, for multiple different eigenvalues obtained by means of extraction, multiple matrix transformations are performed for each eigenvalue, and a combination vector is obtained in a manner of convolutional network calculation on a matrix vector obtained after transformations of each eigenvalue; finally, estimation is performed on the image characteristic in the image data in a fully-connected belief network calculation manner, which effectively improves accuracy of estimation.

The following describes the foregoing embodiment using a group of experimental data.

It is assumed that there are three extracted eigenvalues of the input image data, which are respectively a degree s of matching between each characteristic and a corresponding template characteristic, a value t of a probability that any two characteristics in the image data appear on a same position at the same time, and a value d of a score of a change in a distance between two characteristics that have an association relationship.

It is assumed that 26 characteristics are included in an experiment, and each characteristic corresponds to seven mixture types (mixture type); then, corresponding s has 26*7=182 dimensions, corresponding t has 26*7=182 dimensions, and corresponding d has 26*6=156 dimensions.

It should be noted that, because relative displacement is generated between a characteristic and other three characteristics, and each displacement is represented using two-dimensional data, the other three characteristics include six-dimensional data. In this case, for the 26 characteristics, corresponding d has 26*6=156 dimensions.

It is assumed that there are two types of s obtained in the experiment, where one type belongs to a visual matching score (appearance score), and the other type belongs to a deformation matching score (deformation score).

When s is of a vision matching score, s scores 0.2, and if a mixture type corresponding to the characteristic 1 is 2, an obtained seven-dimensional vector of the characteristic 1 is [0 0.2 0 0 0 0 0].

When s is of a deformation matching score, if a mixture type corresponding to the characteristic 1 is 2, s scores 0.4, and an obtained seven-dimensional vector of the characteristic 1 is [0 0.4 0 0 0 0 0].

In addition, if the mixture type corresponding to the characteristic 1 is 2, correspondingly an obtained seven-dimensional vector of s (vision matching score) is [0 0.2 0 0 0 0 0], and correspondingly an obtained seven-dimensional vector of t is [0 1 0 0 0 0 0].

In this way, data that is input into a computer for calculation includes (182+182+182+156)-dimensional data, that is, 702-dimensional data. After a first matrix transformation is performed, a first submatrix vector of s corresponds to 140-dimensional data, a first submatrix vector of d corresponds to 30-dimensional data, and a first submatrix vector of t corresponds to 30-dimensional data. After a second matrix transformation is performed, a second submatrix vector of s corresponds to 120-dimensional data, a second submatrix vector of d corresponds to 15-dimensional data, and a second submatrix vector of t corresponds to 15-dimensional data. Then, a second matrix vector corresponding to 100-dimensional data is obtained using a convolutional network calculation method.

It may be learned that, as a quantity of matrix transformations increases, a data volume for calculation is reduced, which not only changes complexity of calculation, but also can effectively improve accuracy of calculation, thereby improving accuracy of an estimation result.

Figure 2:
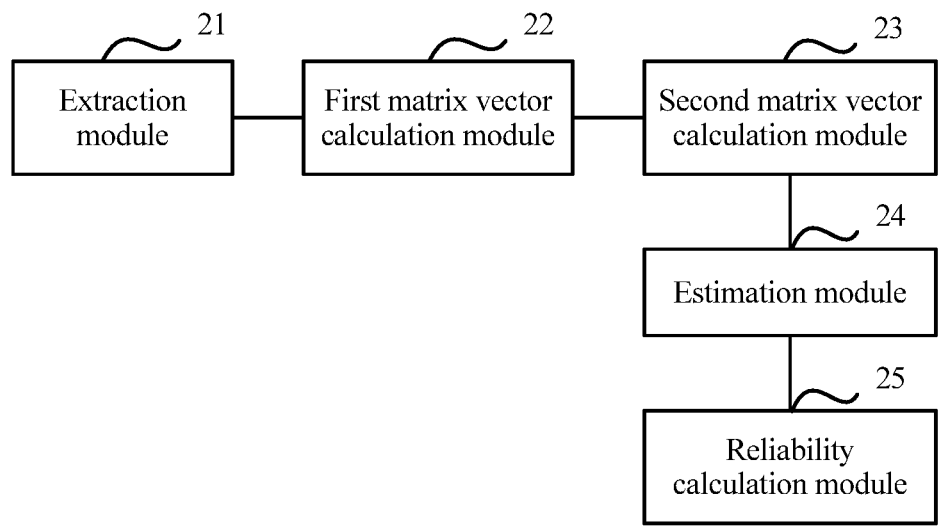
FIG. 2 is a schematic structural diagram of an image characteristic estimation device according to the present disclosure.

As shown in FIG. 2, FIG. 2 is a schematic structural diagram of an image characteristic estimation device according to an embodiment of the present disclosure. The device includes an extraction module 21, a first matrix vector calculation module 22, a second matrix vector calculation module 23, and an estimation module 24.

The extraction module 21 is configured to extract at least two eigenvalues of input image data, where the eigenvalue includes at least a degree of matching between each characteristic and a corresponding template characteristic, a value of a probability that any two characteristics in the image data appear on a same position at the same time, and a value of a score of a change in a distance between two characteristics that have an association relationship.

The first matrix vector calculation module 22 is configured to execute the following operations for each eigenvalue extracted by the extraction module 21, until execution for the extracted eigenvalues is completed: selecting an eigenvalue, and performing at least two matrix transformations on the eigenvalue using a pre-obtained matrix parameter, to obtain a first matrix vector corresponding to the eigenvalue.

The second matrix vector calculation module 23 is configured to, when the first matrix vector that corresponds to each extracted eigenvalue and is obtained by means of calculation by the first matrix vector calculation module 22 is obtained, obtain second matrix vectors with respect to the at least two extracted eigenvalues using a convolutional network calculation method according to the obtained first matrix vector corresponding to each eigenvalue.

The estimation module 24 is configured to obtain a status of an image characteristic in the image data by means of estimation according to the second matrix vectors obtained by means of calculation by the second matrix vector calculation module 23.

The first matrix vector calculation module 22 is configured to select an eigenvalue, and perform a first matrix transformation on the eigenvalue using the pre-obtained matrix parameter, to obtain the first submatrix vector corresponding to the eigenvalue; perform a second matrix transformation on the first submatrix vector using the pre-obtained matrix parameter, to obtain the second submatrix vector corresponding to the eigenvalue; and by analogy, perform an $N^{th}$ matrix transformation on the $(N-1)^{th}$ submatrix vector using the pre-obtained matrix parameter, to obtain the first matrix vector corresponding to the eigenvalue, where N is a natural number.

The first matrix vector calculation module 22 is configured to obtain the first submatrix vector corresponding to the eigenvalue in the following manner:

$$h^{1,i}=a(i^T*W^{1,i}+b^{1,i}),$$

where $h^{1,i}$ represents the first submatrix vector corresponding to the $i^{th}$ extracted eigenvalue, a is an activation function, $i^T$ is a transposed matrix of the $i^{th}$ eigenvalue, $W^{1,i}$ is the first matrix with respect to the $i^{th}$ eigenvalue in the matrix parameter, and $b^{1,i}$ is the first offset with respect to the $i^{th}$ eigenvalue.

The first matrix vector calculation module 22 is configured to obtain the second submatrix vector corresponding to the eigenvalue in the following manner:

$$h^{2,i}=a((h^{1,i})^T*W^{2,i}+(b^{2,i})^T),$$

where $h^{2,i}$ represents the second submatrix vector corresponding to the $i^{th}$ extracted eigenvalue, a is an activation function, $(h^{1,i})^T$ is a transposed matrix of the first submatrix vector of the $i^{th}$ eigenvalue, $W^{2,i}$ is the second matrix with respect to the $i^{th}$ eigenvalue in the matrix parameter, and $(b^{2,i})^T$ is the second offset with respect to the $i^{th}$ eigenvalue.

The second matrix vector calculation module 23 is configured to obtain, using the convolutional network calculation method, the second matrix vectors with respect to the at least two extracted eigenvalues in the following manner:

$$h^{n+1}=a((h^n)^T*W^{n+1}+b^{n+1}),$$

where $h^{n+1}$ is the second matrix vectors that are with respect to the at least two extracted eigenvalues and obtained using the convolutional network calculation method, a is an activation function, $h^n=[h^{n,1},h^{n,2},\ldots,h^{n,i},\ldots,h^{n,n}]^T$, $h^{n,n}$ is a first matrix vector that is of the $n^{th}$ eigenvalue and on which an $n^{th}$ matrix transformation is performed, $W^{n+1}$ is the $(n+1)^{th}$ matrix in the matrix parameter, and $b^{n+1}$ is the $(n+1)^{th}$ offset.

In another embodiment of the present disclosure, the status of the image characteristic in the image data includes position information of the image characteristic in the image data; and the estimation module 24 is configured to obtain the status of the image characteristic in the image data by means of estimation in the following manner:

$$\tilde{y}^{pst}=(\tilde{h}^n)^T*W^{pst}+b^{pst},$$

where $\tilde{y}^{pst}$ is the status, obtained by means of estimation, of the image characteristic in the image data, $W_{pst}$ is a theoretical matrix parameter, $b^{pst}$ is a theoretical offset, $\tilde{h}_n$ is obtained according to $h^n$, and $h^n[h^{n,1},h^{n,2},\ldots,h^{n,i},\ldots,h^{n,n}]^T$.

In another embodiment of the present disclosure, the device further includes a reliability calculation module 25, where the reliability calculation module 25 is configured to determine reliability of the status obtained by means of estimation according to the second matrix vectors obtained by means of calculation by the second matrix vector calculation module.

The reliability calculation module is configured to determine the reliability of the status obtained by means of estimation in the following manner:

$$\tilde{y}^{cls}=\sigma*((h^n)^T*W^{cls}+b^{cls}),$$

where $\tilde{y}^{cls}$ is the determined reliability of the status obtained by means of estimation, $\sigma$ is a function, $\sigma(x)=(1+\exp(-x))^{-1}$, $W^{cls}$ is a theoretical matrix parameter, and $b^{cls}$ is a theoretical offset.

It should be noted that the device provided in this embodiment of the present disclosure may be implemented using hardware, or may be implemented in a software manner, which is not limited herein.

Figure 3:
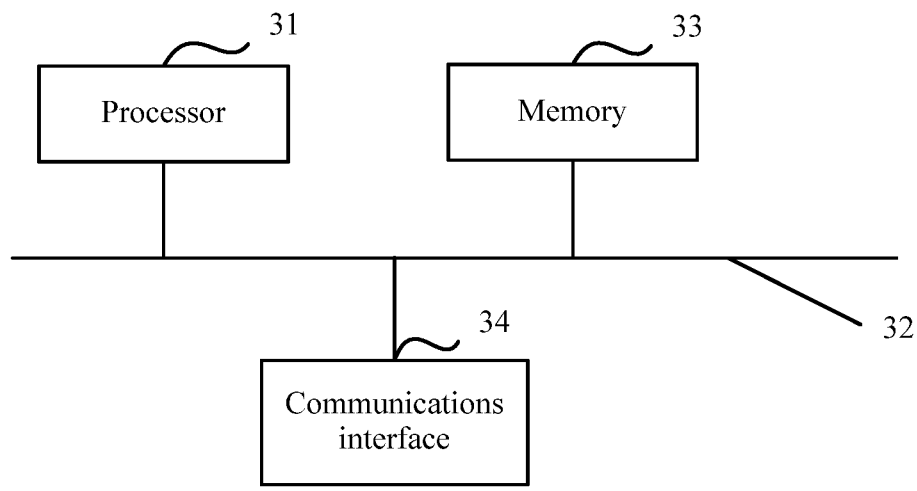
FIG. 3 is a schematic structural diagram of an image characteristic estimation device according to the present disclosure.

As shown in FIG. 3, FIG. 3 is a schematic structural diagram of an image characteristic estimation device according to Embodiment 3 of the present disclosure. The device has a function of executing the foregoing embodiment. The device may use a structure of a general computer system, and the computer system may be a processor-based computer. An entity of the device includes at least one processor 31, a communications bus 32, a memory 33, and at least one communications interface 34.

The processor 31 may be a general central processing unit (CPU), a microprocessor, an application-specific integrated circuit (ASIC), or one or more integrated circuits that are configured to control program execution of the solutions of the present disclosure.

The communications bus 32 may include a channel, over which information is transferred between the foregoing components. The communications interface 34 uses any apparatus of a transceiver type to communicate with another device or communications network, such as an Ethernet, a radio access network (RAN), or a wireless local area network (WLAN).

The computer system includes one or more memories 33, which may be a read-only memory (ROM) or another type of static storage device that can store static information and instructions, a random access memory (RAM) or another type of dynamic storage device that can store information and instructions; and may also be an electrically erasable programmable read-only memory (EEPROM), a compact disc read-only memory (CD-ROM), other compact disc storage, optical disc (including a compact disc, a laser disc, an optical disc, a digital versatile disc, and a blue-ray disc, or the like) storage, and a disk storage medium, another disk storage device, or any other medium that can be used to carry or store expected program code that is in an instruction or digital structure form and that can be accessed by a computer, which, however, is not limited herein. These memories connect to the processor using the bus.

The memory 33 is configured to store application program code that executes the solutions of the present disclosure, and execution thereof is controlled by the processor 31. The processor 31 is configured to execute an application program code stored in the memory 33.

In a possible implementation manner, when the foregoing application program code is executed by the processor 31, the processor 31 is configured to extract at least two eigenvalues of input image data, where the eigenvalue includes at least a degree of matching between each characteristic and a corresponding template characteristic, a value of a probability that any two characteristics in the image data appear on a same position at the same time, and a value of a score of a change in a distance between two characteristics that have an association relationship; execute the following operations for each extracted eigenvalue, until execution for the extracted eigenvalues is completed: select an eigenvalue, and performing at least two matrix transformations on the eigenvalue using a pre-obtained matrix parameter, to obtain a first matrix vector corresponding to the eigenvalue; when a first matrix vector corresponding to each extracted eigenvalue is obtained, obtain second matrix vectors with respect to the at least two extracted eigenvalues using a convolutional network calculation method according to the obtained first matrix vector corresponding to each eigenvalue; and obtain a status of an image characteristic in the image data by means of estimation according to the second matrix vectors.

In another embodiment of the present disclosure, the processor 31 executes selecting an eigenvalue, and performing a first matrix transformation on the eigenvalue using the pre-obtained matrix parameter, to obtain the first submatrix vector corresponding to the eigenvalue; performing a second matrix transformation on the first submatrix vector using the pre-obtained matrix parameter, to obtain the second submatrix vector corresponding to the eigenvalue; and by analogy, performing an $N^{th}$ matrix transformation on the $(N-1)^{th}$ submatrix vector using the pre-obtained matrix parameter, to obtain the first matrix vector corresponding to the eigenvalue, where N is a natural number.

In another embodiment of the present disclosure, the processor 31 executes obtaining the first submatrix vector corresponding to the eigenvalue in the following manner:

$$h^{1,i}=a(i^{T}*W^{1,i}+b^{1,i}),$$

where $h^{1,i}$ represents the first submatrix vector corresponding to the $i^{th}$ extracted eigenvalue, a is an activation function, $i^T$ is a transposed matrix of the $i^{th}$ eigenvalue, $W^{1,i}$ is the first matrix with respect to the $i^{th}$ eigenvalue in the matrix parameter, and $b^{1,i}$ is the first offset with respect to the $i^{th}$ eigenvalue.

In another embodiment of the present disclosure, the processor 31 executes obtaining the second submatrix vector corresponding to the eigenvalue in the following manner:

$$h^{2,i}=a(h^{1,i})^{T}*W^{2,i}+(b^{2,i})^{T}),$$

where $h^{2,i}$ represents the second submatrix vector corresponding to the $i^{th}$ extracted eigenvalue, a is an activation function, $(h^{1,i})^T$ is a transposed matrix of the first submatrix vector of the $i^{th}$ eigenvalue, $W^{2,i}$ is the second matrix with respect to the $i^{th}$ eigenvalue in the matrix parameter, and $(b^{2,i})^T$ is the second offset with respect to the $i^{th}$ eigenvalue.

In another embodiment of the present disclosure, the processor 31 executes obtaining, using the convolutional network calculation method, the second matrix vectors with respect to the at least two extracted eigenvalues in the following manner:

$$h^{n+1}=a((h^{n})^{T}*W^{n+1}+b^{n+1}),$$

where $h^{n+1}$ is the second matrix vectors that are with respect to the at least two extracted eigenvalues and obtained using the convolutional network calculation method, a is an activation function, $h^n=[h^{n,1},h^{n,2},\ldots,h^{n,i},\ldots,h^{n,n}]^T$, $h^{n,n}$ is a first matrix vector that is of the $n^{th}$ eigenvalue and on which an $n^{th}$ matrix transformation is performed, $W^{n+1}$ is the $(n+1)^{th}$ matrix in the matrix parameter, and $b^{n+1}$ is the $(n+1)^{th}$ offset.

In another embodiment of the present disclosure, the status of the image characteristic in the image data includes position information of the image characteristic in the image data; and the processor 31 executes obtaining the status of the image characteristic in the image data by means of estimation in the following manner:

$$\tilde{y}^{pst}=(\tilde{h}^{n})^{T}*W^{pst}+b^{pst},$$

where $\tilde{y}^{pst}$ is the status, obtained by means of estimation, of image characteristic in the image data, $W^{pst}$ is a theoretical matrix parameter, $b^{pst}$ is a theoretical offset, $\tilde{h}_n$ is obtained according to $h^n$, and $h^n=[h^{n,1},h^{n,2},\ldots,h^{n,i},\ldots,h^{n,n}]^T$.

In another embodiment of the present disclosure, the processor 31 is further configured to execute determining reliability of the status obtained by means of estimation according to the second matrix vectors.

In another embodiment of the present disclosure, the processor 31 executes determining the reliability of the status obtained by means of estimation in the following manner:

$$\tilde{y}^{cls}=\sigma*((h^{n})^{T}*W^{cls}+b^{cls}),$$

where $\tilde{y}^{cls}$ is the determined reliability of the status obtained by means of estimation, $\sigma$ is a function, $\sigma(x)=(1+\exp(-x))^{-1}$, $W^{cls}$ is a theoretical matrix parameter, and $b^{cls}$ is a theoretical offset.

In this embodiment, for processing of the estimation device and a method for interaction between the device and another network element when the application program code is executed by the processor, refer to the foregoing method embodiment. Details are not described herein.

The device provided in this embodiment may resolve a problem existing in the prior art that estimation accuracy is low when estimation is performed on an image characteristic.

Persons skilled in the art should understand that the embodiments of the present disclosure may be provided as a method, an apparatus (device), or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the apparatus (device), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present disclosure have been described, persons skilled in the art can make changes and modifications to these embodiments once they learn the basic inventive concept. Therefore, the following claims are intended to be construed as to cover the embodiments and all changes and modifications falling within the scope of the present disclosure.

Obviously, persons skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. An image characteristic estimation method of a human body characteristic in the field of human body recognition, comprising:
    extracting at least two eigenvalues of input image data, the eigenvalue comprising at least a degree of matching between each characteristic and a corresponding template characteristic, a value of a probability that any two characteristics in the image data appear on a same position at the same time, and a value of a score of a change in a distance between two characteristics that have an association relationship;
    selecting an eigenvalue, and performing at least two matrix transformations on the eigenvalue using a pre-obtained matrix parameter in order to obtain a first matrix vector corresponding to the eigenvalue;
    obtaining second matrix vectors with respect to the at least two extracted eigenvalues using a convolutional network calculation method according to a first matrix vector corresponding to each eigenvalue when the first matrix vector corresponding to each extracted eigenvalue is obtained; and
    obtaining a status of an image characteristic in the image data by means of estimation according to the second matrix vectors for improved accuracy of estimation,
    wherein selecting the eigenvalue, obtaining the second matrix vectors, and obtaining the status of the image characteristic are executed for each extracted eigenvalue until execution for the extracted eigenvalues is completed.

2. The method of claim 1, wherein selecting the eigenvalue, and performing the at least two matrix transformations on the eigenvalue using the pre-obtained matrix parameter, to obtain the first matrix vector corresponding to the eigenvalue comprises:
    selecting an eigenvalue, and performing a first matrix transformation on the eigenvalue using the pre-obtained matrix parameter in order to obtain a first submatrix vector corresponding to the eigenvalue; and
    iteratively performing, from 2 to N, an $N^{th}$ matrix transformation on the $(N-1)^{th}$ submatrix vector using the pre-obtained matrix parameter in order to obtain the first matrix vector corresponding to the eigenvalue, N being a natural number.

3. The method of claim 2, wherein performing the first matrix transformation on the eigenvalue using the pre-obtained matrix parameter in order to obtain the first submatrix vector corresponding to the eigenvalue comprises obtaining the first submatrix vector corresponding to the eigenvalue by:

$$h^{1,i}=a(i^T*W^{1,i}+b^{1,i}),$$

$h^{1,i}$ representing the first submatrix vector corresponding to the $i^{th}$ extracted eigenvalue, a being an activation function, $i^T$ being a transposed matrix of the $i^{th}$ eigenvalue, $W^{1,i}$ being the first matrix with respect to the $i^{th}$ eigenvalue in the matrix parameter, and $b^{1,i}$ being the first offset with respect to the $i^{th}$ eigenvalue.

4. The method of claim 3, wherein performing the second matrix transformation on the first submatrix vector using the pre-obtained matrix parameter in order to obtain the second submatrix vector corresponding to the eigenvalue comprises obtaining the second submatrix vector corresponding to the eigenvalue by:

$$h^{2,i}=a((h^{1,i})^T*W^{2,i}+(b^{2,i})^T),$$

$h^{2,i}$ representing the second submatrix vector corresponding to the $i^{th}$ extracted eigenvalue, a being an activation function, $(h^{1,i})^T$ being a transposed matrix of the first submatrix vector of the $i^{th}$ eigenvalue, $W^{2,i}$ being the second matrix with respect to the $i^{th}$ eigenvalue in the matrix parameter, and $(b^{2,i})^T$ being the second offset with respect to the $i^{th}$ eigenvalue.

5. The method of claim 1, wherein obtaining the second matrix vectors with respect to the at least two extracted eigenvalues using the convolutional network calculation method according to the obtained first matrix vector corresponding to each eigenvalue comprises obtaining, using the convolutional network calculation method, the second matrix vectors with respect to the at least two extracted eigenvalues by:

$$h^{n+1}=a((h^n)^T*W^{n+1}+b^{n+1}),$$

$h^{n+1}$ being the second matrix vectors that are with respect to the at least two extracted eigenvalues and obtained using the convolutional network calculation method, a being an activation function, $h^n=[h^{n,1},h^{n,2},\ldots,h^{n,i},\ldots,h^{n,n}]^T$, $h^{n,n}$ being a first matrix vector that is of the $n^{th}$ eigenvalue and on which an $n^{th}$ matrix transformation is performed, $W^{n+1}$ being the $(n+1)^{th}$ matrix in the matrix parameter, and $b^{n+1}$ being the $(n+1)^{th}$ offset.

6. The method of claim 1, wherein the status of the image characteristic in the image data comprises position information of the image characteristic in the image data, and obtaining the status of the image characteristic in the image data by means of estimation according to the second matrix vectors comprising obtaining the status of the image characteristic in the image data by means of estimation based on:

$$\tilde{y}^{pst}=(\tilde{h}^n)^T*W^{pst}+b^{pst},$$

$\tilde{y}^{pst}$ being the status, obtained by means of estimation, of the image characteristic in the image data, $W^{pst}$ being a theoretical matrix parameter, $b^{pst}$ being a theoretical offset, $\tilde{h}^n$ being obtained according to $h^n$, and $h^n=[h^{n,1},h^{n,2},\ldots,h^{n,i},\ldots,h^{n,n}]^T$.

7. The method of claim 1, further comprising determining reliability of the status obtained by means of estimation according to the second matrix vectors.

8. The method of claim 7, wherein determining reliability of the status obtained by means of estimation according to the second matrix vectors comprises determining the reliability of the status obtained by means of estimation by:

$$\tilde{y}^{cls}=\sigma*((h^n)^T*W^{cls}+b^{cls}),$$

$\tilde{y}^{cls}$ being the determined reliability of the status obtained by means of estimation, σ being a function, σ(x)=(1+

$\exp(x))^{-1}$, $W^{cls}$ being a theoretical matrix parameter, and $b^{cls}$ being a theoretical offset.

9. An image characteristic estimation device for estimating a human body characteristic in the field of human body recognition, comprising:
a memory storing executable instructions; and
a processor coupled to the memory and configured to:
extract at least two eigenvalues of input image data, the eigenvalue comprising at least a degree of matching between each characteristic and a corresponding template characteristic, a value of a probability that any two characteristics in the image data appear on a same position at the same time, and a value of a score of a change in a distance between two characteristics that have an association relationship; and
execute the following operations for each eigenvalue extracted, until execution for the extracted eigenvalues is completed:
selecting an eigenvalue, and performing at least two matrix transformations on the eigenvalue using a pre-obtained matrix parameter in order to obtain a first matrix vector corresponding to the eigenvalue;
obtain second matrix vectors with respect to the at least two extracted eigenvalues using a convolutional network calculation method according to the obtained first matrix vector corresponding to each eigenvalue when the first matrix vector that corresponds to each extracted eigenvalue and is obtained by means of calculation; and
obtain a status of an image characteristic in the image data by means of estimation according to the second matrix vectors obtained by means of calculation for improved accuracy of estimation.

10. The device of claim 9, wherein the processor is further configured to:
select an eigenvalue, and perform a first matrix transformation on the eigenvalue using the pre-obtained matrix parameter in order to obtain a first submatrix vector corresponding to the eigenvalue;
perform a second matrix transformation on the first submatrix vector using the pre-obtained matrix parameter in order to obtain a second submatrix vector corresponding to the eigenvalue; and
perform, by analogy, an $N^{th}$ matrix transformation on the $(N-1)^{th}$ submatrix vector using the pre-obtained matrix parameter in order to obtain the first matrix vector corresponding to the eigenvalue, N being a natural number.

11. The device of claim 10, wherein the processor is configured to obtain the first submatrix vector corresponding to the eigenvalue by:

$$h^{1,i}=a(i^T*W^{1,i}+b^{1,i}),$$

$h^{1,i}$ representing the first submatrix vector corresponding to the $i^{th}$ extracted eigenvalue, a being an activation function, $i^T$ being a transposed matrix of the $i^{th}$ eigenvalue, $W^{1,i}$ being the first matrix with respect to the $i^{th}$ eigenvalue in the matrix parameter, and $b^{1,i}$ being the first offset with respect to the $i^{th}$ eigenvalue.

12. The device of claim 11, wherein the processor is further configured to obtain the second submatrix vector corresponding to the eigenvalue by:

$$h^{2,i}=a((h^{1,i})^T*W^{2,i}+(b^{2,i})^T),$$

$h^{2,i}$ representing the second submatrix vector corresponding to the $i^{th}$ extracted eigenvalue, a is an activation function, $(h^{1,i})^T$ being a transposed matrix of the first submatrix vector of the $i^{th}$ eigenvalue, $W^{2,i}$ being the second matrix with respect to the $i^{th}$ eigenvalue in the matrix parameter, and wherein $(b^{2,i})^T$ being the second offset with respect to the $i^{th}$ eigenvalue.

13. The device of claim 9, wherein the processor is further configured to obtain, using the convolutional network calculation method, the second matrix vectors with respect to the at least two extracted eigenvalues by:

$$h^{n+1}=a((h^n)^T*W^{n+1}+b^{n+1}),$$

$h^{n+1}$ being the second matrix vectors that are with respect to the at least two extracted eigenvalues and obtained using the convolutional network calculation method, a being an activation function, $h^n=[h^{n,1},h^{n,2}, \ldots, h^{n,i}, \ldots, h^{n,n}]^T$, $h^{n,n}$ being a first matrix vector that is of the $n^{th}$ eigenvalue and on which an $n^{th}$ matrix transformation is performed, $W^{n+1}$ being the $(n+1)^{th}$ matrix in the matrix parameter, and $b^{n+1}$ being the $(n+1)^{th}$ offset.

14. The device of claim 9, wherein the status of the image characteristic in the image data comprises position information of the image characteristic in the image data, and the processor being further configured to obtain the status of the image characteristic in the image data by means of estimation by:

$$\tilde{y}^{pst}=(\tilde{h}^n)^T*W^{pst}+b^{pst},$$

$\tilde{y}^{pst}$ being the status, obtained by means of estimation, of the image characteristic in the image data, $W^{pst}$ being a theoretical matrix parameter, $b^{pst}$ being a theoretical offset, $\tilde{h}^n$ being obtained according to $h^n$, and $h^n=[h^{n,1},h^{n,2}, \ldots, h^{n,i}, \ldots, h^{n,n}]^T$.

15. The device of claim 9, wherein the processor is further configured to determine reliability of the status obtained by means of estimation according to the second matrix vectors obtained by means of calculation.

16. The device of claim 15, wherein the processor is further configured to determine the reliability of the status obtained by means of estimation by:

$$\tilde{y}^{cls}=\sigma*((h^n)^T*W^{cls}+b^{cls}),$$

$\tilde{y}^{cls}$ being the determined reliability of the status obtained by means of estimation, σ being a function, $\sigma(x)=(1+\exp(x))^{-1}$, $W^{cls}$ being a theoretical matrix parameter, and $b^{cls}$ being a theoretical offset.

* * * * *

UNITED STATES PATENT AND TRADEMARK OFFICE
CERTIFICATE OF CORRECTION

PATENT NO. : 10,115,208 B2
APPLICATION NO. : 15/355324
DATED : October 30, 2018
INVENTOR(S) : Wanli Ouyang et al.

It is certified that error appears in the above-identified patent and that said Letters Patent is hereby corrected as shown below:

On the Title Page

Item (30), Line 1: "201410220036" should read "201410220036.0"

In the Claims

Column 23, Line 1: Claim 8 "$\exp(x))^{-1}$" should read "$\exp(-x))^{-1}$"

Column 24, Line 14: Claim 12 "and wherein $(b^{2,i})^T$" should read "and $(b^{2,i})^T$"

Column 24, Line 54: Claim 16 "$\exp(x))^{-1}$" should read "$\exp(-x))^{-1}$"

Signed and Sealed this
Eighth Day of January, 2019

Andrei Iancu
*Director of the United States Patent and Trademark Office*